US010422853B2

(12) United States Patent
Sark et al.

(10) Patent No.: US 10,422,853 B2
(45) Date of Patent: Sep. 24, 2019

(54) METHOD AND SYSTEM FOR OVERSAMPLING A WAVEFORM WITH VARIABLE OVERSAMPLING FACTOR

(71) Applicant: IHP GmbH—Innovations for High Performance Microelectronics / Leibniz-Institut für innovative Mikroelektronik, Frankfurt (Oder) (DE)

(72) Inventors: Vladica Sark, Frankfurt (Oder) (DE); Eckhard Grass, Berlin (DE); Jesus Gutierrez Teran, Frankfurt (Oder) (DE)

(73) Assignee: IHP GmbH—Innovations for High Performance Microelectronics/Liebniz-Institut Für Innovative Mikroelektronik, Frankfurt (Oder) (DE)

( * ) Notice: Subject to any disclaimer, the term of this patent is extended or adjusted under 35 U.S.C. 154(b) by 0 days.

(21) Appl. No.: 16/014,100

(22) Filed: Jun. 21, 2018

(65) Prior Publication Data

US 2018/0372835 A1 Dec. 27, 2018

(30) Foreign Application Priority Data

Jun. 22, 2017 (EP) .................... 17177424

(51) Int. Cl.
*H04W 24/00* (2009.01)
*G01S 5/14* (2006.01)
(Continued)

(52) U.S. Cl.
CPC ............. *G01S 5/14* (2013.01); *G01S 1/042* (2013.01); *G01S 5/0226* (2013.01); *H04B 1/02* (2013.01); *H04L 27/00* (2013.01)

(58) Field of Classification Search
CPC ... G01S 5/02; G01S 5/0252; H04L 29/08657; H04W 4/029
See application file for complete search history.

(56) References Cited

U.S. PATENT DOCUMENTS 7,054,374 B1 * 5/2006 Jensen ................. H04L 5/1423
375/220
8,234,324 B2 * 7/2012 Tietjen ............... H03H 17/0621
708/300
(Continued)

FOREIGN PATENT DOCUMENTS

WO 2016192763 12/2016

OTHER PUBLICATIONS

Vladica Sark, et al., "Modified Equivalent Time Sampling for Improving Precision of Time-of-Flight Based Localization", IEEE 24th International Symposium on Personal, Indoor and Mobile Radio Communications: Fundamental and PHY Track, Sep. 2013, pp. 370-374.

(Continued)

*Primary Examiner* — Shantell L Heiber
(74) *Attorney, Agent, or Firm* — Ware, Fressola, Maguire & Barber LLP

(57) ABSTRACT

A method and system for oversampling a waveform with variable oversampling factor is suggested. The method and for dynamic selection of the oversampling factor are based on a modified equivalent time sampling approach. Multiple waveforms are transmitted, which are separated by a variable delay. The method permits that a receiver selects a different oversampling factor for the received waveform. As a result the method and system provide for oversampling a waveform with a variable, dynamically selectable oversampling factor.

20 Claims, 5 Drawing Sheets

(51) Int. Cl.
  *G01S 1/04* (2006.01)
  *H04B 1/02* (2006.01)
  *H04L 27/00* (2006.01)
  *G01S 5/02* (2010.01)

(56) References Cited

U.S. PATENT DOCUMENTS

2011/0129023 A1* 6/2011 Hoffmann ............ H04L 27/2613
  375/260
2012/0147943 A1* 6/2012 Goodman ............... H04L 27/01
  375/232
2016/0352419 A1* 12/2016 Fonseka ............. H04B 10/0793

OTHER PUBLICATIONS

Peter J. Pupalaikis, "Random Interleaved Sampling (RIS)", Mar. 2016, (21 pages).

* cited by examiner

METHOD AND SYSTEM FOR OVERSAMPLING A WAVEFORM WITH VARIABLE OVERSAMPLING FACTOR

CROSS REFERENCE TO RELATED APPLICATION

This application claims priority under 35 USC § 119 to European Patent Application No. 17177424.3 filed on Jun. 22, 2017, which application is hereby incorporated by reference in its entirety.

TECHNICAL FIELD

The present invention relates to a method and a system for oversampling a waveform. The invention also relates to a transmitter to be used in a system according to the invention.

BACKGROUND OF THE INVENTION

The most commonly used system for position detection is based on a mobile receiver device receiving time signals transmitted by radio along a line of sight from satellites. The system allows the mobile receiver determining its location in terms of longitude, latitude, and altitude/elevation to high precision, for instance within a few meters. The system can be used for providing position, navigation or for tracking the position of something fitted with a receiver. Examples of such kind of satellite navigation systems with global coverage are the US American Global Positioning System (GPS) and the European Galileo system. For the sake of brevity, in the following, reference will only be made to GPS as a representative for all other kinds of satellite navigation systems.

Today, there is a plethora of location-based services that require knowing the position of the user of a service. However, for cost or other reasons a GPS system is not always available. A very cost effective approach to implement location-based services is if location determination is performed by utilizing hardware that is already installed for other purposes like wireless data connection. For example, in an agricultural environment there are many monitoring and measuring devices installed, which are dedicated to measure environmental parameters to determine for instance a need for irrigation or fertilization in certain areas of a field.

Specifically, it is possible to utilize known positions of existing radio base stations that can be detected from a user's computational device (e.g., laptop or tablet computer, PDA, smart phone, wristwatch, etc.). One example is Wi-Fi (802.11) radio networking. By detecting one or more Wi-Fi base stations ("access points"), a device can compute its own latitude, longitude, and/or elevation based on knowledge of the base stations' positions. Other radio base stations (e.g., cell phone towers, AM and FM radio stations, TV stations, etc.) can be utilized in a similar manner. The base stations can be considered as radio beacons.

Utilizing existing radio base stations means a user's computational device can compute its own location without a GPS receiver. Utilizing an existing radio receiver that is already part of the user's computational device for data transmission reduces cost while availability of the service is increased. Furthermore, since base stations are usually detectable in situations where GPS fails, this technique works where GPS does not.

Generally, in location detection systems using terrestrial transmitters a pseudorandom signal is emitted by the transmitters having a known location and the signal is received by a mobile receiver. The transmitter transmits a characteristic binary signal that is known and detected by the receiver with a matched filter in order to determine from the filter response a precise point of time when the signal is received. Ranging (i.e. distance estimation) using radio frequency (RF) waveforms is performed by estimating the time-of-arrival (ToA) of a received waveform at the receiver, being transmitted by the transmitter. In that way the time-of-arrival (ToA) can be determined. By sampling this waveform with a low sample rate, precise estimation of the ToA is challenging and leads most of the times to reduced ranging (and positioning) precision. This effect of reducing the ranging precision due to finite sample rate is called "range binning". In other words, the accuracy of the location determination depends on the granularity of quantization in the time domain to determine an accurate ToA. However, conventional Wi-Fi, or other commonly used data transmission hardware does not always provide for a high sample rate enabling a location determination that is sufficiently precise for most location based services.

Reducing the range binning effect, i.e. increasing the ranging precision, is normally performed by increasing the sample rate of the A/D converters in the receivers. This is usually an expensive solution, since the price of the A/D converters depends on their sample rate.

The most common method for increasing the sample rate, without using a high sample rate A/D converter is called equivalent time sampling (ETS). However, the ETS approach is performed and is applicable only on periodic waveforms and is mainly used in oscilloscopes. Furthermore, the ETS approach requires A/D converters having the capability to provide subsample delays.

In RF ranging and positioning applications this method usually cannot be implemented due to the lack of A/D converters which can perform subsample delays. The RF ranging and positioning methods are commonly implemented on standard RF data transceivers, which are only capable of equidistant sample acquisition and do not have any capability for synchronization with the incoming waveform or performing subsample delays.

For alleviating this problem a method for a modified equivalent time sampling (METS) was proposed. Using this method, the periodic waveform is prepared at the transmitter. The subsample delays are introduced in the transmitted signal between each two copies of the waveform to be oversampled. The receiver samples the incoming waveform equidistantly and stores the samples in memory. The stored samples are later interleaved in order to reconstruct an oversampled version of the waveform. The METS is designed to support a fixed oversampling rate. In systems with multiple receivers among which not all have the capacity to handle the fixed oversampling rate this presents a problem.

Thus, there remains a need for an alternative positioning system which is miniaturized and less costly than a GPS system and works even when there is no reception of a sufficient number of satellites to perform the positioning of the receiver.

SUMMARY OF THE INVENTION

According to a first aspect of the present invention a method for generating a signal for transmission is suggested. The method comprises
  generating a waveform;
  up-sampling the waveform by a factor N to create an up-sampled version of the waveform;

generating a sequence of copies of the up-sampled version of the waveform;

inserting a variable delay between each copy of the up-sampled waveform;

down-sampling the copies of the up-sampled waveform by a factor M; and converting the down-sampled copies of the waveform into an analog signal for transmission.

The method enables implementing improved distance and ranging measurements based on hardware which is used also for other purposes such as data transmission. In particular, the insertion of a variable delay permits the use of conventional A/D converters that cannot provide for subsample time delays.

Advantageously, the variable delay is selected to correspond to an integer multiple of a sample interval modified by an adaptation interval that is smaller than the sample interval. In this way it is possible to interpose samples of additional copies of the waveform and to obtain oversampling of the waveform without requiring an increased sample rate of the A/D converter.

In a particularly advantageous embodiment the variable delay is selected such that each next waveform copy is sampled at a point in time in between of two samples acquired from previous copies of the waveform. Subsequent interleaving of the so acquired samples enables oversampling of the waveform in a convenient way.

Specifically, the adaptation interval can be selected to correspond to the sample interval multiplied by a factor of ½, ¼, −¼, ⅛, −⅛, etc.

It has been found useful in some applications of the inventive method to increase the number of copies of the waveform as a function of the oversampling factor making the inventive method particularly versatile for a range of applications associated with different requirements with regard to the precision of location-based services. Generally, it has been found useful to choose the number of copies to be equal to $2^n$ if the oversampling factor is $2^n$. In other words, the performance of the invention can be scaled up and down to adapt to a variety of different needs of specific applications.

In an improvement of the inventive method the copies of the waveform are shaped with a pulse shaping filter for confining the signal to a desired band.

According to a second aspect of the present invention a method for receiving a signal that has been transmitted by a method according to the first aspect of the present invention is suggested. The method comprises receiving the signal containing a predetermined number of copies of a waveform, wherein the copies are separated by a variable delay;

equidistant sampling of the copies of the waveform at a predetermined sampling rate; and interleaving the samples of the copies of the waveform to obtain an oversampled version of the waveform.

The variable delay between the copies of the waveform ensures that samples of the different copies are taken at different instances of time and thus oversampling of the waveform is achieved with an analog to digital converter having a sampling rate which is not sufficient to obtain the desired oversampling directly by sampling a single copy of the waveform.

Advantageously, an embodiment of the method enables limiting the sampling of the copies of the waveform to a sub-group of all received copies of the waveform. Consequently, it is possible that receivers with different performance can be operated at the same time. I.e. some receivers sample only the first copy of the waveform, which is not oversampled. Other receivers sample only the first and second copy of the waveform to reconstruct an oversampled signal with an oversampling factor of 2. Finally, some receivers sample all copies of the waveform to reconstruct an oversampled signal with a maximum oversampling factor. Different sampling rates can also be achieved with METS, but each receiver has to wait for all samples to arrive. Therefore, the time that could be used for signal processing, e.g. in ranging applications, it would be spent on acquiring samples, which delays the processing.

According to a third aspect of the present invention a transmitter for generating a signal, comprising a waveform generator for generating copies of a waveform, an up-sampler for up-sampling the waveform by a factor N and a delay stage for introducing a variable delay between each copy of the waveform is suggested. The transmitter further comprises a down-sampler to sample the copies of the waveform down by a factor of M and a digital-to-analog converter for converting the copies of the down-sampled copies of the waveforms into an analog signal, which is transmitted by the transmitter. The transmitter is set up to perform the method according to the first aspect of the invention and as such brings about corresponding advantages.

In an advantageous embodiment of the transmitter the delay stage introduces a variable delay corresponding to an integer multiple of a sample interval modified by an adaptation interval that is smaller than the sample interval.

In another embodiment of the transmitter the variable delay can be selected such that each next waveform copy is sampled at a point in time in between of two samples acquired from previous copies of the waveform.

According to a useful generalization of the transmitter, the number of copies of the waveform is equal $2^n$ if the oversampling factor is $2^n$.

In a useful development the transmitter comprises a pulse shaping filter for shaping the copies of the waveform for confining the signal to a desired band.

According to a fourth aspect of the present invention the system for detecting the location of a mobile receiver, comprising several transmitters, which are at fixed locations and at least one mobile receiver is suggested. The transmitters are adapted for performing a method according to first aspect of the invention. The mobile receiver performs a method according to the second aspect of the invention.

Advantageously, the system comprises multiple mobile receivers, which are adapted to receive the same copies of the waveforms and are enabled to select different oversampling rates.

BRIEF DESCRIPTION OF THE DRAWINGS

Exemplary embodiments of the present disclosure are illustrated in the drawings and are explained in more detail in the following description. In the figures the same or similar elements are referenced with the same or similar reference signs.

DETAILED DESCRIPTION

Figure 1:
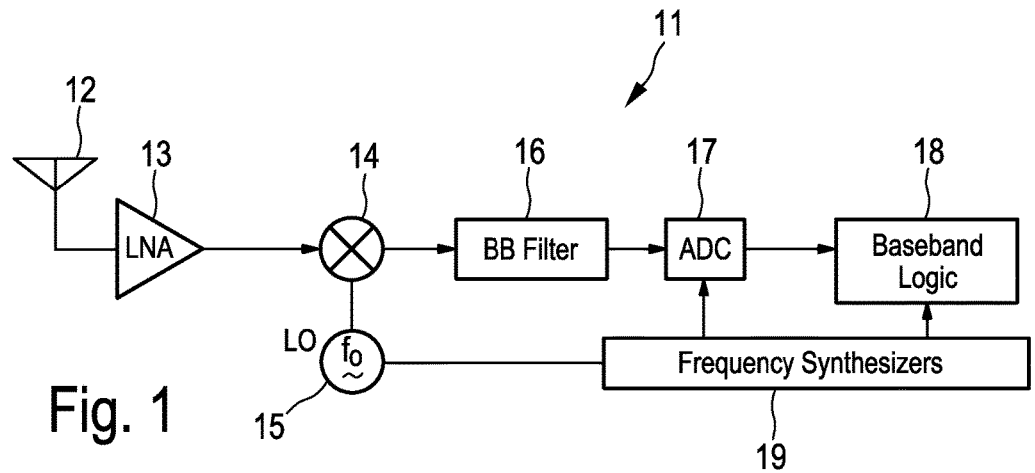
FIG. 1 shows a schematic block diagram of a Wi-Fi receiver.

FIG. 1 shows an architecture of a typical Wi-Fi receiver 11. A radio or radio frequency signal (RF signal) is received by an antenna 12 and amplified by a low noise amplifier 13. The amplified signal is mixed down by a mixer 14 to a baseband signal. The mixer 14 is connected with a local oscillator 15. The baseband signal is then processed by a baseband filter 16 to confine the signal to a desired band. The output signal of baseband filter 16 is sampled by an analog to digital converter (ADC) 17 and data samples are passed to a baseband processor 18, which decodes the signal. The Wi-Fi receiver 11 is driven by the local oscillator 15 which also feeds a frequency synthesizer 19 and a phase locked loop (PLL) (not shown). The frequency synthesizer 19 generates a centre frequency while the PLL serves as a clock source for the ADC 17 and the baseband processor 18. For a 22 MHz channel the receiver runs at a clock rate of 44 MHz or faster determining the clock rate of the ADC 17. It is noted that FIG. 1 shows only an exemplary embodiment of a Wi-Fi receiver and the present invention is more generally applicable including other types of Wi-Fi receivers as well.

Ranging (i.e. distance estimation) using RF waveforms is performed by estimating the time-of-arrival (ToA) of a received waveform at the receiver that was transmitted by a transmitter. By sampling this waveform with a low sample rate, e.g. a sample rate approximately corresponding to the Nyquist rate, precise estimation of the ToA is quite limited.

This would lead to reduced ranging (and positioning) precision. This effect of reducing the ranging precision due to finite sample rate is called "range binning". In the example given above with a clock rate of 44 MHz of the ADC the precision of the ToA is limited to 22.7 ns. Given the propagation speed of a radio signal of approximately $3 \times 10^8$ m/s the ranging precision is limited to about 6.8 m, which is not sufficient for many location based services.

Reducing the range binning effect, i.e. increasing the ranging precision, is normally performed by increasing the sample rate of the A/D converters in the receivers. This is usually an expensive solution, since the price of the A/D converters depends on the sample rate.

The most common method for increasing the sample rate, without using high sample rate A/D converters, is called equivalent time sampling (ETS). The ETS approach is performed and is applicable only on periodic waveforms and is mainly used in oscilloscopes.

Figure 2:
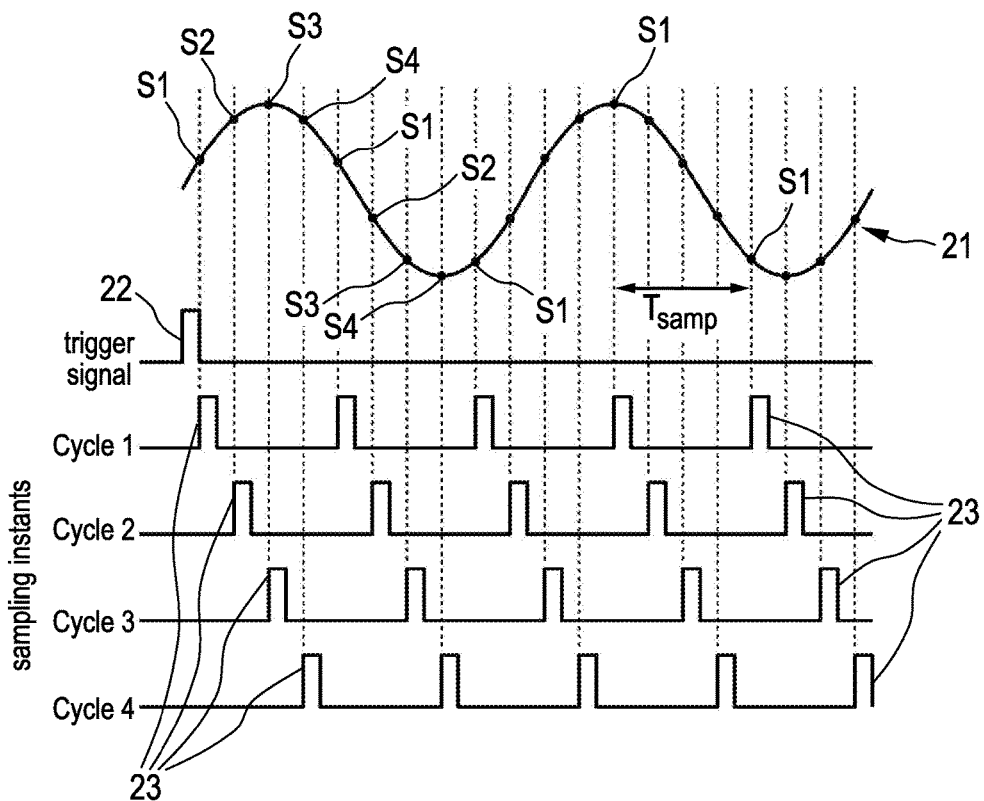
FIG. 2 shows an illustration of equivalent time sampling.

Using ETS, oversampling of the waveform is performed by sampling the waveform in different time instants for each successive period (cycle) with an ADC. The start of each period of the waveform is detected and the start of the sampling is delayed with respect to the start of the period. This delay is increased for each successive period. The delay is increased for a subsample interval, which leads to obtaining samples in different time instances, with respect to the start of the period of the periodic waveform. This method is illustrated in FIG. 2 for a periodic sine waveform 21. For each new period (cycle) of the sine waveform 21, a trigger signal 22 is generated. In a first period (cycle 1) samples, shown as pulses 23, are obtained and stored in a memory (not shown). The samples of cycle 1 are shown as dots on the sine waveform 21 and labelled as S1. The memory can be integrated of the processor 18 or is a separate device. For a second period (cycle 2), again a trigger signal 22 is generated. The sampling for cycle 2 is delayed and starts slightly later compared to the previous period and yields samples labelled as S2. As can be seen in FIG. 2, the new obtained samples S2 in the second period (cycle 2) are not the same as the samples obtained in the first period (cycle 1). Further, in the third and fourth period (cycle 3, cycle 4), the same procedure is repeated and yields samples S3 and S4. The samples S2, S3, and S4 are stored in the memory as well. By interleaving or superposing the samples S1 to S4 of each cycle (cycles 1 to 4) an oversampled version of the sine waveform is obtained. The sample rate $T_{Samp}$ of the ADC is represented by the distance between two samples of the same cycle, i.e. the time between two samples within the same cycle, e.g. two samples S1.

In order to be able to perform ETS two conditions must be fulfilled. Firstly, the transmitted signal must be periodic, and, secondly, the A/D converter must be able to perform subsample delays enabling starting the sampling of subsequent cycles (cycles 2 to 4) later than the sampling of the first cycle (cycle 1). In the example shown in FIG. 2 the subsample delay is $T_{Samp}/4$.

In RF ranging and positioning applications this method usually cannot be implemented due to the lack of A/D converters which can perform subsample delays. The RF ranging and positioning methods are commonly implemented on standard RF data transceivers, which are only capable of equidistant sample acquisition and do not have any capability for synchronization with the incoming waveform or performing subsample delays.

A method called modified equivalent time sampling (METS) alleviates this problem. Using this method, the periodic waveform is prepared at the transmitter. The subsample delays are introduced by the transmitter in the transmitted signal between each two copies of the waveform to be oversampled. The receiver samples the incoming waveform equidistantly and stores the samples in a memory. The stored samples are later interleaved in order to reconstruct an oversampled version of the waveform.

Figure 3:
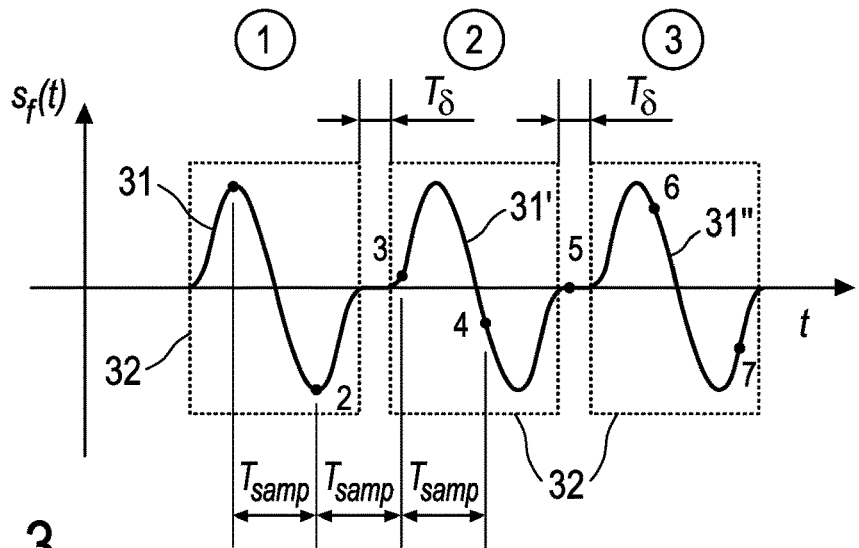
FIG. 3 shows a waveform prepared in the modified equivalent time sampling transmitter.

An illustration of this method is shown in FIG. 3 demonstrating oversampling a single period of a sine wave. The diagram in FIG. 3 displays on the ordinate the amplitude of the sine waves as a function of time t, which progresses from left to right on the abscissa of the diagram. A first copy 31 of the period of the sine wave is shown in a box 32 framed by a dotted line in FIG. 3. In order to obtain oversampling with a factor of 3, three copies 31, 31' and 31" of the period of the sine waveform are created and a constant subsample interval of τδ is digitally inserted between them, as shown in FIG. 3. The sampling period of the D/A converter is again $T_{samp}$.

Figure 4:
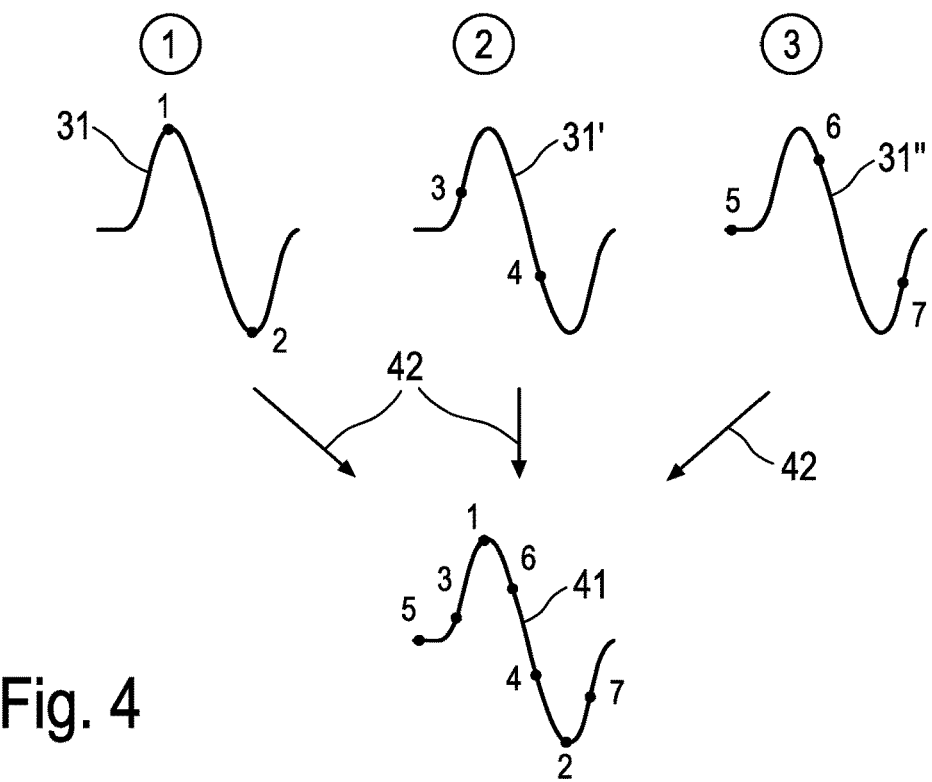
FIG. 4 shows a reconstructed oversampled version of a sine wave using modified equivalent time sampling.

With this sampling interval the created signal is transmitted and received at a receiver. For the purpose of easier explanation and without loss of generality, it can be assumed that the received waveform samples are acquired at the same time instants at the receiver, as the samples used at a D/A converter in the transmitter. The samples for the three sine waveforms are interleaved in order to form a single oversampled sine waveform 41 having seven samples shown as dots 1 to 7 on the wave form 41 in FIG. 4. The process of interleaving is symbolized in FIG. 4 by arrows 42. Oversampling with a factor 3 permits to determine the ToA three times more precisely and, hence, yields a ranging precision likewise increased by a factor 3.

The main issue with this approach is that the METS method is intended to support a fixed oversampling rate. In multiuser systems, where large number of nodes should use the same RF signals for positioning (localization), this can represent an issue. The problem is that not every node requires the same positioning precision and, therefore, the same oversampling factor. Also, not every node has enough resources to process a large number of samples acquired with high oversampling factors, which are needed to obtain a given ranging precision. The nodes can select smaller oversampling factors, but they would need to acquire all of the received samples and dispose the ones which are not needed. This approach would lead to larger latency for obtaining the results (i.e. ToA) due to the acquisition of samples that are not needed at all.

Therefore, according to an embodiment of the present invention a method for dynamic selection of the oversampling factor is suggested based on the known METS approach. With this method, each node (receiver or input device) can select a different oversampling factor for the received waveform. Hence, the method provides for oversampling a waveform with a variable, dynamically selectable oversampling factor. This method is called "binary modified equivalent time sampling" (binary METS).

Figure 5:
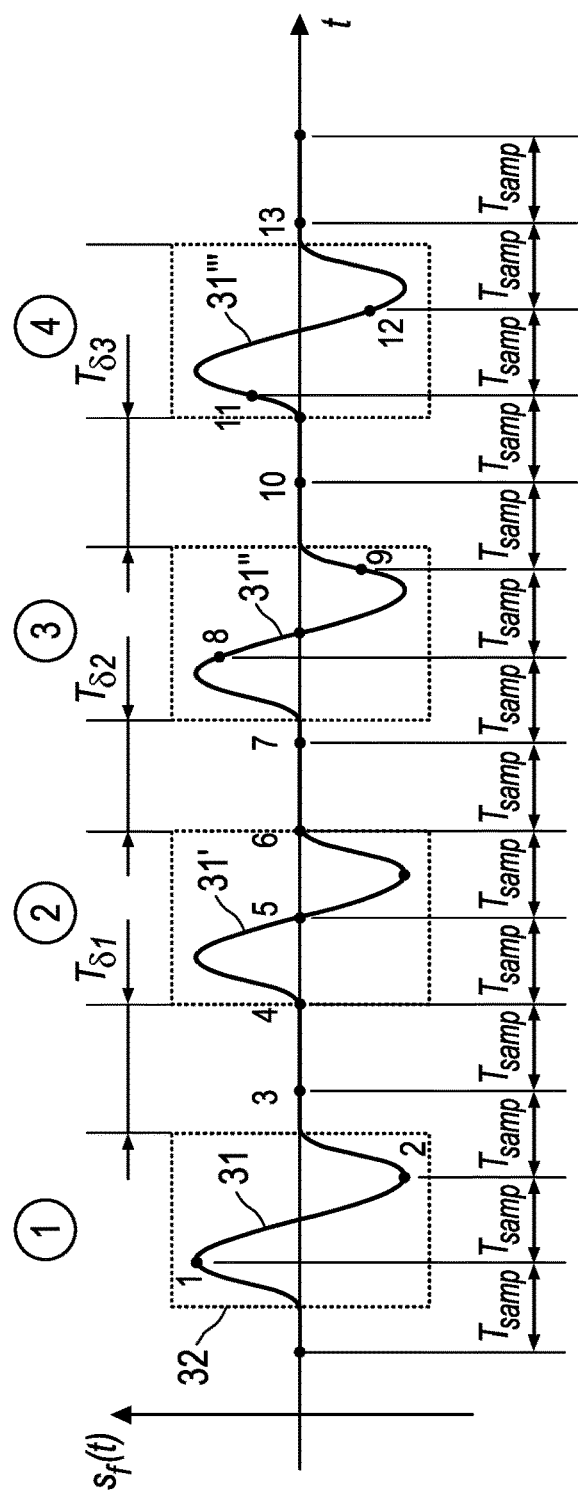
FIG. 5 shows a signal to be used in the binary modified equivalent time sampling method.

An example of this method is shown in FIG. 5. The waveform 31 to be oversampled is shown in box 32 framed by a dotted line. There are four copies of the same waveform, namely 31, 31', 31" and 31'" in this example. The complete waveform intended for transmission is converted to analog form by creating samples which are provided to a D/A converter. The samples are marked with numbers from 1 to 13 in this example. Then these samples are filtered by a filter at the transmitter. The obtained analog waveforms are the same as the one shown in FIG. 4.

Variable delays τδi are introduced between the waveform copies 31, 31', 31" and 31'" in the boxes 32. The delays τδi are chosen such that each next waveform copy is sampled at a point in time in between of two samples acquired from previous copies of the waveform. The sampling period is $T_{samp}$. For example the samples 4, 5 and 6 are exactly in the places between samples 1, 2 and 3 if both waveform copies (1 and 2 in circle) were one on top of each other.

The same is valid for the samples from the last two waveform copies (3 and 4 in circles). The samples 7 to 13 would fall in between the samples from the two previous groups if the waveforms are superposed, one on top of each other. Thus, the signal to be transmitted is constructed of repeated copies of the waveform which have to be oversampled. Between the copies, delays are inserted. These delays, τδi, are not equal as in the METS approach.

As can be noticed, if only the samples from the first waveform copy (1 in circle) are used the waveform would not be oversampled. By using the samples from the first and the second group, and interleaving them, an oversampling factor of 2 can be achieved. By using the samples from the two last waveform copies (3 and 4 in circles) and interleaving them in with the samples from the first and second group, an oversampling factor of 4 can be achieved.

The delay inserted between the first and the second waveform copy should be such that the second copy would be shifted for a ½ sampling period $T_{samp}$ with respect to the first waveform copy. Therefore, the first waveform should start after $N1T_{samp}+\frac{1}{2}T_{samp}$. Here N1 is the number of samples needed to sample the first waveform copy. Due to the shift of $\frac{1}{2}T_{samp}$ the samples from the second waveform copy are exactly placed between the samples of the first waveform copy. Further, the third waveform copy should be placed at distance of $N2T_{samp}-\frac{1}{4}T_{samp}$. In this case N2 is the number of samples needed to sample the first, the second waveform copy as well as the introduced delay between them. The samples obtained from the third waveform are going to fall exactly between the samples from the first and the second waveform copy. For example, the position of the sample 8 is exactly between the position of sample 1 and sample 5 in FIG. 4. Further, the fourth waveform should be shifted for $N3T_{samp}+\frac{1}{4}T_{samp}$ with respect to the first waveform copy. Here N3 is the number of samples needed to sample the first three waveform copies as well as the introduced delays between them. The process can continue by adding four additional waveform copies for introducing samples on positions between the positions at which samples were already taken.

Generally speaking for a given oversampling factor $2^n$ the necessary number of copies of the waveform equals $2^n$.

The described approach for increasing the oversampling factor can be continued until the ToA measurement and thus the ranging is precise enough for a desired location based service. With regard to the example of a 44 MHz clock rate providing a precision for the ranging of 6.8 m without oversampling, a factor 4 oversampling increases the ranging precision to 1.7 m and a factor 8 oversampling increases the ranging precision to 0.85 m, which is probably more than good enough for most location based services.

Figure 6:
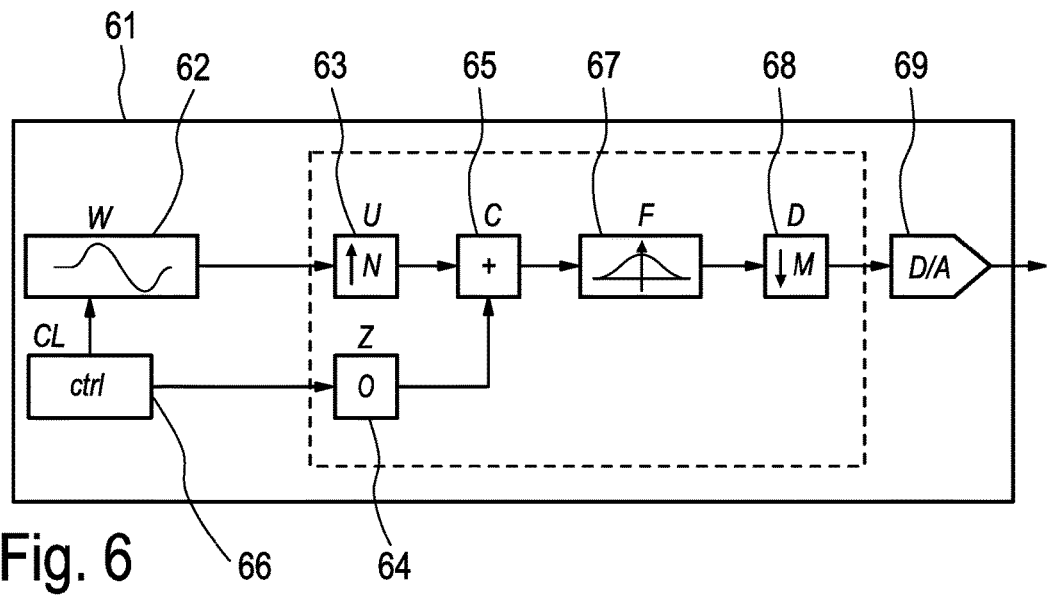
FIG. 6 shows a binary modified equivalent time sampling transmitter.

The copies of the wave forms 31, 31', 31" and 31'" are created by means of a digital-to-analog (D/A) converter before being transmitted by a transmitter 61 (FIG. 6). FIG. 5 seems to suggest that the samples are taken from an analog waveform and then sent to the D/A converter. However, in a practical implementation in the transmitter a digitally oversampled waveform is used to obtain the samples needed to be supplied to the D/A converter. The waveform in the transmitter is oversampled to the final maximum oversampling factor that is intended to be achieved with the use of binary METS. Signal processing which is necessary for enabling the invention is performed in the oversampled digital domain. The final sample rate, supplied to the D/A converter, would be again down-sampled to the original sample rate at which the waveform was generated.

FIG. 6 shows a schematic block diagram of a transmitter 61. The waveforms are generated in the waveform generator 62. The sample rate, for this waveform, is at least as high as the Nyquist rate or higher. The waveform generated by the waveform generator 61 is up-sampled N times in the digital domain of the transmitter 61. This is performed in block 63. After each generated and up-sampled waveform copy, a corresponding delay is generated by a delay stage 64 and inserted in block 65 between the waveform copies. A control logic 66 controls the waveform generator 62 and the delay stage 64. This signal is further filtered using a pulse shaping filter 67 and down-sampled by factor of M in a decimator 68. The down-sampled waveform is supplied to a D/A converter 69. The decimation factor M can be equal to N or can be smaller than N. If this factor is smaller than N, already oversampled version of the wave form is supplied to the D/A converter 69. A certain amount of oversampling does not interfere with the suggested method and is useful since most D/A converters 69 are offering the oversampling capability at competitive costs. The up-sampling factor N corresponds to the oversampling factor N that is intended to be achieved with the binary METS according to the present invention.

At the receiver, the transmitted waveform and its copies are received and samples are acquired at the sample rate $T_{samp}$ at which they were generated at the waveform generator 62. The process of obtaining samples from the analog waveform copies has been explained with reference to FIG. 5.

Figure 7:
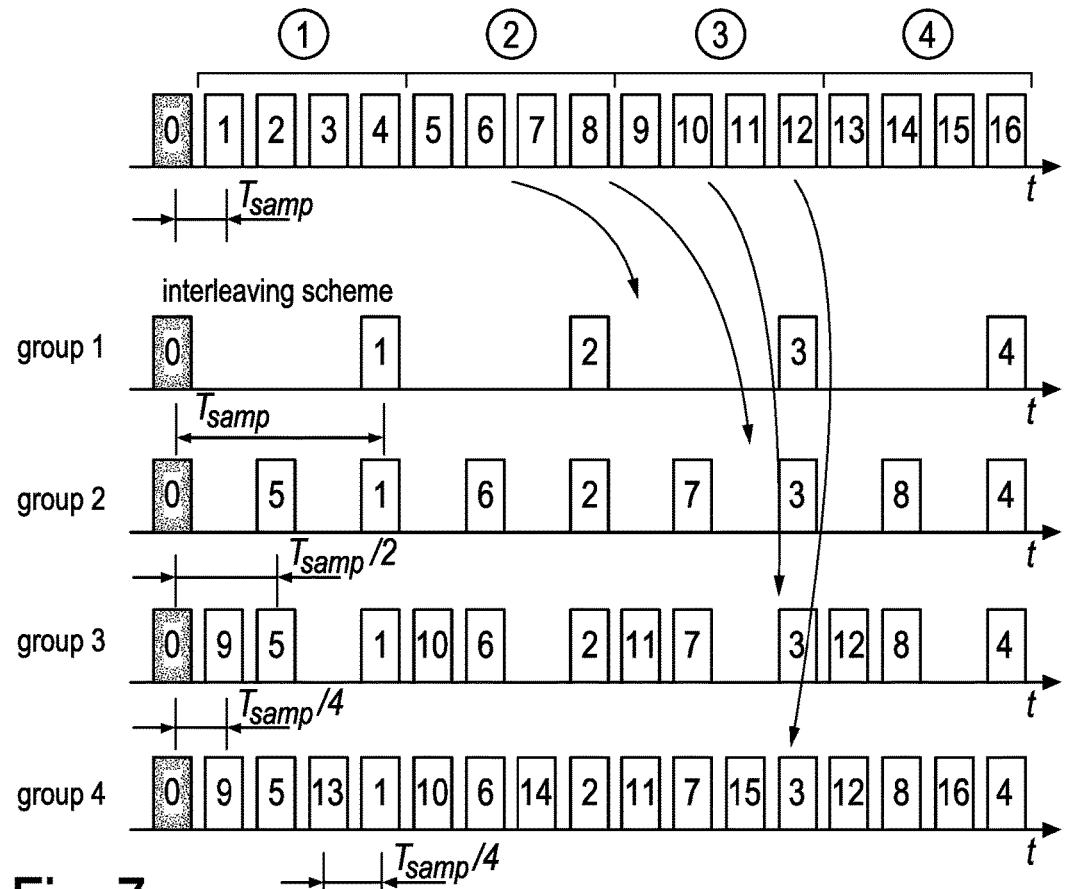
FIG. 7 shows an interleaving scheme for reconstructing an oversampled signal.

These samples are grouped and interleaved as shown in FIG. 7. The samples acquired consist of four waveform copies sampled with four samples in this embodiment. They are grouped in four groups, each containing four samples. There is one extra sample labelled as 0 which is placed first. This extra sample is obtained due to the added subsample intervals. The sample 0 is a sample at the beginning of a new sequence of copies of the waveform. Group 1 is formed by taking one sample of each copy of the waveform (samples 1 to 4). Similarly groups 2, 3, and 4 (samples 5 to 8, 9 to 12, and 13 to 16, respectively) are formed by four samples each. The samples of groups 1 to 4 are shifted in time with regard to one another as described above. The time shifts are caused by the delays $\tau\delta i$ introduced between the waveform copies 31, 31', 31" and 31''' on the transmitter side. After acquisition the samples are stored in the memory and then interleaved as illustrated in FIG. 7 in order to obtain a four times oversampled waveform.

By using only the first group, a non-oversampled copy of a single waveform is reconstructed. By putting the samples from the second group between the samples of the first group, as shown in FIG. 7, an oversampling by a factor of 2 is achieved, and the distance between the reconstructed samples is $T_{samp}/2$. Further, by inserting the samples from the third and the fourth group between the samples of the first and second group, as shown in FIG. 7, an oversampling by a factor of 4 is achieved and the distance between the samples of the reconstructed waveform is $T_{samp}/4$.

By using more samples of the incoming signal, the waveform of interest can be reconstructed with higher oversampling ratio. The receiver can use only the first arriving samples to reconstruct an oversampled signal with the required sample rate. This can be also achieved with METS, but the receiver has to wait for the required samples to arrive. Therefore, the time that can be used for signal processing, e.g. in ranging applications, it would be spent on acquiring samples. Even when the signal processing is performed in parallel with the sample acquisition in the case of METS the latency would be higher compared to the latency in binary METS. This is due to the arrangement of the samples in binary METS, where the receiver acquires the required samples without disposing samples from the received signal. The METS method, on the other hand, if not reconstructing waveform with the maximal sample rate, must dispose samples which are not needed but are received.

Figure 8:
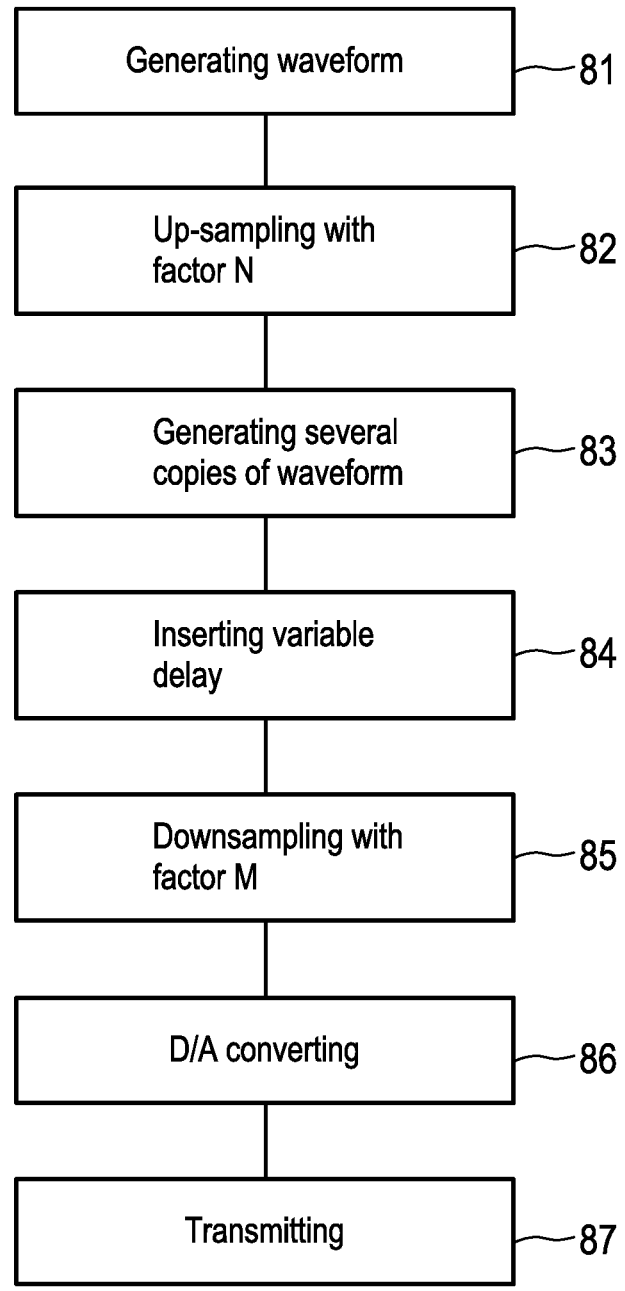
FIG. 8 shows a schematic flow diagram of the method according to the invention.

FIG. 8 schematically illustrates the binary METS method. A digital waveform is generated with a number of samples satisfying at least the Nyquist rate (step 81). This waveform is up-sampled with a factor N (step 82). Several copies of this digital waveform are created (step 83) and the variable delay is inserted between each copy of the digital waveforms (step 84). The copies of the digital waveforms are then down-sampled by a factor of M (step 85) before the copies are digital-to-analog converted (step 86) and finally transmitted (step 87).

The invention has been described in the context of ranging and location detection. But it is likewise applicable to other technical areas where it is desirable to obtain an oversampled version of a waveform utilizing A/D converters offering only a sample rate that is too low to achieve the desired oversampling.

Individual components or functionalities of the present invention are described in the exemplary embodiments as software or hardware solution. This does not mean, however, that a functionality described as a software solution cannot be implemented in hardware as well, and vice versa. Likewise, mixed solutions are also conceivable for one skilled in the art, in which parts of components and functionalities are simultaneously implemented in software and hardware.

In the claims, the word "comprise" does not exclude other elements or steps, and the undefined article "a" does not exclude a plurality.

A single unit or device may perform the functions of several elements set forth in the claims. The fact that individual functions and elements are listed in different dependent claims does not mean that a combination of these functions and elements could not be used advantageously.

What is claimed:

1. A method for generating a signal for transmission, the method comprising
    generating a waveform;
    up-sampling the waveform by a factor N to create an up-sampled version of the waveform;
    generating a sequence of copies of the up-sampled version of the waveform;
    inserting a variable delay between each copy of the up-sampled waveform;
    down-sampling the copies of the up-sampled waveform by a factor M; and
    converting the down-sampled copies of the waveform into an analog signal for transmission.
2. The method according to claim 1, further comprising selecting the variable delay to correspond to an integer multiple of a sample interval modified by an adaptation interval that is smaller than the sample interval.
3. The method according to claim 2 further comprising selecting the variable delay such that each next waveform copy is sampled at a point in time in between of two samples acquired from previous copies of the waveform.
4. The method according to claim 3 further comprising selecting the adaptation interval to corresponds to the sample interval multiplied by a factor of ½, ¼, −¼, ⅛, −⅛, etc.
5. The method according to claim 4, further comprising increasing the number of copies of the waveform as a function of an oversampling factor.
6. The method according to claim 5 further comprising choosing the number of copies to equal $2^n$ if the oversampling factor is $2^n$.
7. The method according to claim 6, further comprising shaping the copies of the waveform with a pulse shaping filter.
8. The method according to claim 2 further comprising selecting the adaptation interval to corresponds to the sample interval multiplied by a factor of ½, ¼, −¼, ⅛, −⅛, etc.
9. The method according to claim 1, further comprising increasing the number of copies of the waveform as a function of an oversampling factor.
10. The method according to claim 9, further comprising choosing the number of copies to equal $2^n$ if the oversampling factor is $2^n$.
11. The method according to claim 1, further comprising shaping the copies of the waveform with a pulse shaping filter.
12. A method for receiving a signal that has been transmitted according to the method of claim 1, the method comprising receiving the signal containing a predetermined number of the copies of the waveform, wherein the copies are separated by the variable delay;

equidistant sampling of the copies of the waveform at a predetermined sampling rate; and interleaving the samples of the copies of the waveform to obtain an oversampled version of the waveform.

13. The method according to claim 12, further comprising limiting the sampling of the copies of the waveform to a sub-group of all received copies of the waveform.

14. A transmitter for generating a signal, comprising a waveform generator for generating copies of a waveform, an up-sampler for up-sampling the waveform by a factor N and a delay stage for introducing a variable delay between each copy of the waveform, wherein the transmitter further comprises a down-sampler to sample the copies of the waveform down by a factor of M and a digital-to-analog converter for converting the copies of the down-sampled copies of the waveforms into an analog signal, which is transmitted by the transmitter.

15. The transmitter according to claim 14, wherein the delay stage introduces a variable delay corresponding to an integer multiple of a sample interval modified by an adaptation interval that is smaller than the sample interval ($T_{samp}$).

16. The transmitter according to claim 15, wherein the variable delay is selected such that each next waveform copy is sampled at a point in time in between of two samples acquired from previous copies of the waveform.

17. The transmitter according to claim 14, wherein the number of copies of the waveform is equal $2^n$ if the oversampling factor is $2^n$.

18. The transmitter according to claim 14, wherein the transmitter comprises a pulse shaping filter for shaping the copies of the waveform.

19. A system for detecting the location of a mobile receiver, comprising several transmitters, which are at fixed locations and at least one mobile receiver, wherein the transmitters are adapted for performing a method comprising:

generating a waveform;

up-sampling the waveform by a factor N to create an up-sampled version of the waveform;

generating a sequence of copies of the up-sampled version of the waveform;

inserting a variable delay between each copy of the up-sampled waveform;

down-sampling the copies of the up-sampled waveform by a factor M; and converting the down-sampled copies of the waveform into an analog signal for transmission, and wherein the mobile receiver is configured to perform a method comprising:

receiving the signal containing a predetermined number of the copies of the waveform, wherein the copies are separated by the variable delay;

equidistant sampling of the copies of the waveform at a predetermined sampling rate; and interleaving the samples of the copies of the waveform to obtain an oversampled version of the waveform.

20. The system according to claim 19 comprising multiple mobile receivers, which are adapted to receive the same copies of the waveforms and are enabled to select different oversampling rates.

* * * * *